(12) United States Patent
Davis et al.

(10) Patent No.: US 10,710,175 B2
(45) Date of Patent: Jul. 14, 2020

(54) ORBITAL DRILL WITH LEFT-HANDED AND RIGHT-HANDED FLUTES

(71) Applicant: Kennametal Inc., Latrobe, PA (US)

(72) Inventors: Danny R. Davis, Asheboro, NC (US); Stephen G. Pritchard, Bennett, NC (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/191,488

(22) Filed: Nov. 15, 2018

(65) Prior Publication Data

US 2020/0156162 A1 May 21, 2020

(51) Int. Cl.
*B23C 5/10* (2006.01)
*B23C 3/02* (2006.01)
*B23B 51/08* (2006.01)

(52) U.S. Cl.
CPC .......... *B23C 5/10* (2013.01); *B23C 3/02* (2013.01); *B23B 51/08* (2013.01); *B23B 2251/046* (2013.01); *B23B 2251/406* (2013.01); *B23C 2210/0492* (2013.01); *B23C 2210/203* (2013.01); *B23C 2220/52* (2013.01); *Y10T 408/35* (2015.01); *Y10T 409/303808* (2015.01); *Y10T 409/307616* (2015.01)

(58) Field of Classification Search
CPC ..... B23C 3/02; B23C 5/10; B23C 2210/0492; B23C 2210/203; B23C 2220/52; B23B 51/08; B23B 2251/406
See application file for complete search history.

(56) References Cited

U.S. PATENT DOCUMENTS

| | | | |
|---|---|---|---|
| 3,667,857 A * | 6/1972 | Shaner et al. | B23B 51/08 408/230 |
| 3,913,196 A | 10/1975 | Maday | |
| 4,227,837 A | 10/1980 | Yodoshi | |
| 4,572,714 A | 2/1986 | Suzuki et al. | |
| 7,204,663 B2 * | 4/2007 | Dov | B23B 51/08 407/53 |
| 7,770,276 B2 * | 8/2010 | Christ, Jr. | B23B 51/009 29/90.01 |

(Continued)

FOREIGN PATENT DOCUMENTS

| | | | |
|---|---|---|---|
| CN | 105364153 A | 3/2016 | |
| FR | 2910358 A3 * | 6/2008 | B23B 41/02 |

(Continued)

*Primary Examiner* — Eric A. Gates
(74) *Attorney, Agent, or Firm* — Matthew S. Bedsole

(57) ABSTRACT

An orbital drill includes a drilling portion, a shank portion, and a neck portion between the drilling portion and the shank portion. The drilling portion includes one or more right-handed spiral flutes with cutting edges having a positive axial rake angle for positive cutting action while orbiting into a material. The right-handed spiral flutes have a positive radial and axial rake angle. The drilling portion also includes one or more left-handed spiral flutes located rearward of the one or more right-handed spiral flutes with cutting edges having a positive axial and radial rake angle for positive cutting action while orbiting back out of the material and removing any material left in the hole, thereby eliminating a separate reaming operation. A method of machining a workpiece using the orbital drill is also disclosed.

18 Claims, 3 Drawing Sheets

(56) References Cited

U.S. PATENT DOCUMENTS

| | | | |
|---|---|---|---|
| 8,336,645 B2* | 12/2012 | Robson | E21B 17/10 |
| | | | 166/241.6 |
| 9,174,287 B2* | 11/2015 | Shpigelman | B23C 5/10 |
| 9,410,379 B2 | 8/2016 | Silva | |
| 9,643,263 B2* | 5/2017 | Krenzer | B23C 3/02 |
| 2008/0253846 A1 | 10/2008 | Ni et al. | |
| 2010/0158626 A1* | 6/2010 | Nakahata | B23B 35/005 |
| | | | 408/230 |
| 2010/0183383 A1 | 7/2010 | Volokh et al. | |
| 2012/0051863 A1* | 3/2012 | Craig | B23B 51/08 |
| | | | 408/1 R |
| 2013/0058734 A1 | 3/2013 | Volokh | |
| 2013/0209184 A1 | 8/2013 | Barry et al. | |
| 2013/0259585 A1* | 10/2013 | Xu | B23C 5/10 |
| | | | 407/54 |
| 2013/0294852 A1* | 11/2013 | Winebrenner | B23C 5/10 |
| | | | 407/54 |
| 2015/0147127 A1 | 5/2015 | Shpigelman et al. | |
| 2015/0298224 A1* | 10/2015 | Gross | B23C 5/10 |
| | | | 407/34 |
| 2017/0216936 A1 | 8/2017 | Dodds et al. | |

FOREIGN PATENT DOCUMENTS

| | | | |
|---|---|---|---|
| GB | 191208537 A * | 12/1912 | B23C 5/04 |
| GB | 191306571 A * | 3/1914 | B23C 5/04 |
| GB | 513643 A * | 10/1939 | B23C 5/04 |
| GB | 2473094 B | 2/2011 | |
| JP | 57107718 A * | 7/1982 | |
| JP | 58056719 A * | 4/1983 | B23B 51/08 |
| JP | 2601803 B2 * | 4/1997 | B23C 5/10 |
| JP | 2015000458 A2 | 1/2015 | |

\* cited by examiner

ORBITAL DRILL WITH LEFT-HANDED AND RIGHT-HANDED FLUTES

BACKGROUND OF THE INVENTION

Fiber reinforced plastic (FRP) materials are widely used in aerospace industry due to its high specific strength and high specific stiffness. FRP materials are composite materials consisting of soft resin matrix and high strength fiber reinforcement. Typical fiber reinforcements include carbon fibers (CFRP), glass fibers (GFRP), Kevlar fibers, and the like. FRP materials are often processed into a laminated structure. FRP materials have excellent in-plane strength, but low inter-laminar strength.

Conventional drilling also known as "push drilling" is a common practice used with metals. The drill is pressed downward along the axis of the tool to create a hole. Drilling with this method reduces side to side deflection in the metal layers. However, push drilling CFRP materials is typically problematic and fiber delamination and other damage is an issue.

One approach to reduce the fiber delamination is to use an orbital drilling process. Orbital drilling is a hole making operation by milling in which the center of an end mill orbits about the center of the intended hole while spinning on its own axis and moving in the axial direction. Orbital drilling is also called "circular milling" or "helical interpolation."

Orbital drills are used to machine through stacks of multiple types of materials, such as Titanium and carbon fiber reinforced plastic (CFRP). Because all these materials have different machining properties, they react differently when being machined, making it difficult to maintain hole tolerance through the entire hole depth. As a result, the hole has to be reamed after drilling, thereby increasing manufacturing cost.

SUMMARY OF THE INVENTION

The problem of drilling through stacks of multiple types of materials without the need of reaming the hole is solved by providing an orbital drill with right-handed spiral flutes having a positive axial rake angle to freely cut the materials on the entry (i.e., orbiting into the materials), and left-handed spiral flutes located rearward of the right-handed spiral flutes and having a positive axial rake angle to freely cut the materials on the exit (i.e., orbiting back out of the materials), thereby eliminating the need for a separate reaming operation.

In one aspect, a cutting tool comprises a drilling portion and a shank portion. The drilling portion includes a first flute having a right-handed helix configuration with a first cutting edge having a positive axial rake angle for positive cutting action while orbiting into a material to form a hole in the material, and a second flute located rearward of the first flute and having a left-handed helix configuration with a second cutting edge having a positive axial rake angle for positive cutting action while orbiting back out of the material and removing any residual material in the hole due to deflection of the cutting tool when orbiting into the material, thereby eliminating a separate reaming operation.

In another aspect, an orbital drill comprises a drilling portion, a shank portion, and a neck portion between the drilling portion and the shank portion. The drilling portion includes a first flute having a right-handed helix configuration with a first cutting edge having a positive axial rake angle for positive cutting action while orbiting into a material to form a hole in the material using a first orbital drilling operation, and a second flute located rearward of the first flute and having a left-handed helix configuration with a second cutting edge having a positive axial rake angle for positive cutting action while orbiting back out of the material using a second orbital drilling operation, thereby removing any residual material in the hole due to deflection of the cutting tool when orbiting into the material using the first orbital drilling operation, thereby eliminating a separate reaming operation.

In yet another aspect, a method of machining a workpiece using an orbital drill, the orbital drill comprising a drilling portion and a shank portion, wherein the drilling portion includes a first flute having a right-handed helix configuration with a first cutting edge having a positive axial rake angle, and a second flute located rearward of the first flute and having a left-handed helix configuration with a second cutting edge having a positive axial rake angle, the method comprising:
  positioning the orbital drill with respect to a workpiece to begin a machining cycle; and
  forming a hole in the workpiece with the cutting edge of the first flute with the right-handed spiral configuration using a first orbital drilling operation; and
  moving the orbital drill out from the hole in the workpiece using a second orbital drilling operation,
  wherein residual material due to deflection of the orbital drill when forming the hole in the workpiece using the first orbital drilling operation is removed from the hole using the cutting edge of the left-handed spiral flutes when moving the orbital drill out from the workpiece using the second orbital drilling operation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
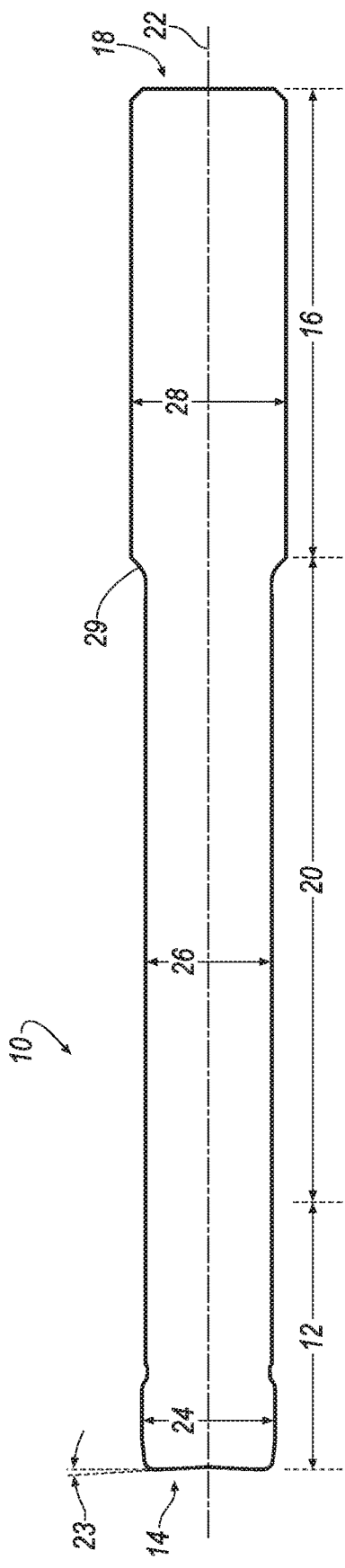
FIG. 1 is a side view of the cutter profile of an orbital drill for machining through stacks of multiple types of materials according to an exemplary embodiment of the invention.

Below are illustrations and explanations for a version of a cutting tool, such as an orbital drill, and the like, with both right-handed helical or spiral flutes and left-handed helical or spiral flutes for machining a workpiece (not shown) made of multiple materials. However, it is noted that the cutting tool may be configured to suit any specific application, such as reaming, end milling, and the like, and is not limited only to the example in the illustrations.

The description herein of specific applications should not be a limitation on the scope and extent of the use of the cutting tool.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, a left hand of cut (i.e., left hand rotation) is defined as a cutting tool, such as an orbital drill, and the like, that must revolve clockwise to cut when viewed from the cutting end of the tool.

As used herein, a right hand of cut (i.e., right hand rotation) is defined as a cutting tool, such as an orbital drill, and the like, that must revolve counter-clockwise to cut when viewed from the cutting end of the tool.

As used herein, a flute has a left-handed spiral or helical configuration when the flutes twist away from the observer in a counter-clockwise direction when viewed from either end of the cutting tool. The flutes having a left-handed spiral or helical configuration push the chips ahead of the cutting tool and out the other side of a hole to be machined in the workpiece.

As used herein, a flute has a right-handed spiral or helical configuration when the flutes twist away from the observer in a clockwise direction when viewed from either end of the cutting tool. The flutes having a right-handed spiral or helical configuration pull the chips toward the back of the cutting tool and out the hole to be machined in the workpiece.

As used herein, a helix, plural helixes or helices, is a type of smooth space curve, i.e., a curve in three-dimensional space. It has the property that the tangent line at any point makes a constant angle with a fixed line called the axis (i.e., longitudinal axis).

Referring to FIG. 1, wherein like reference characters represent like elements, an exemplary cutting tool for orbital drilling is generally shown at 10. The cutting tool 10 of the invention is particular useful for machining a workpiece (not shown). The workpiece may be made of a single material or multiple materials having different material properties. For example, the workpiece may be a single layer of carbon fiber reinforced plastic (CFRP) material or metal material. In another example, the workpiece may include a top layer of CFRP material and a bottom layer of metal material, such as Titanium, and the like.

In general, the cutting tool 10 comprises a solid body including a drilling portion 12 at one end 14 (i.e., the forward cutting end) and a shank portion 16 at the other, opposite end 18 (i.e., the rear non-cutting end). As shown in FIG. 1, the drilling portion 12 and the shank portion 16 are sequentially arranged along a longitudinally-extending axis of rotation 22 with the drilling portion 12 proximate the forward cutting end 14 of the orbital drill 10, and the shank portion 16 proximate the rear non-cutting end 18 of the orbital drill 10. The forward cutting end 14 may include a dish angle 23 that can range between about two (2) degrees to about six (6) degrees. The orbital drill 10 may also include a neck portion 20 between the drilling portion 12 and the shank portion 16. One purpose of the neck portion 20 is to permit clearance of the orbital drill 10 during a machining operation. Another purpose of the neck portion 20 is allow chips to be ejected during the machining operation. Typically, the neck portion 20 is dimensioned in length to be greater than the entire thickness of the workpiece (not shown) to be machined.

The drilling portion 12 has a cutting diameter 24, the neck portion 20 has a neck diameter 26, and the shank portion 16 has a shank diameter 28. In general, the neck diameter 26 is less than the cutting diameter 24, and the cutting diameter 24 may be less than, equal to or greater than the shank diameter

28. For example, the neck diameter 26 can be about 65 to 95 percent of the cutting diameter 24, and the cutting diameter 24 can be greater than 50 of the shank diameter 28. The orbital drill 10 may also include a circumferential tapered surface 29 between the neck portion 20 and the shank portion 16. However, it will be appreciated that the tapered surface 29 may be omitted, and the neck portion 20 and the shank portion 16 can have approximately the same diameter.

Figure 2:
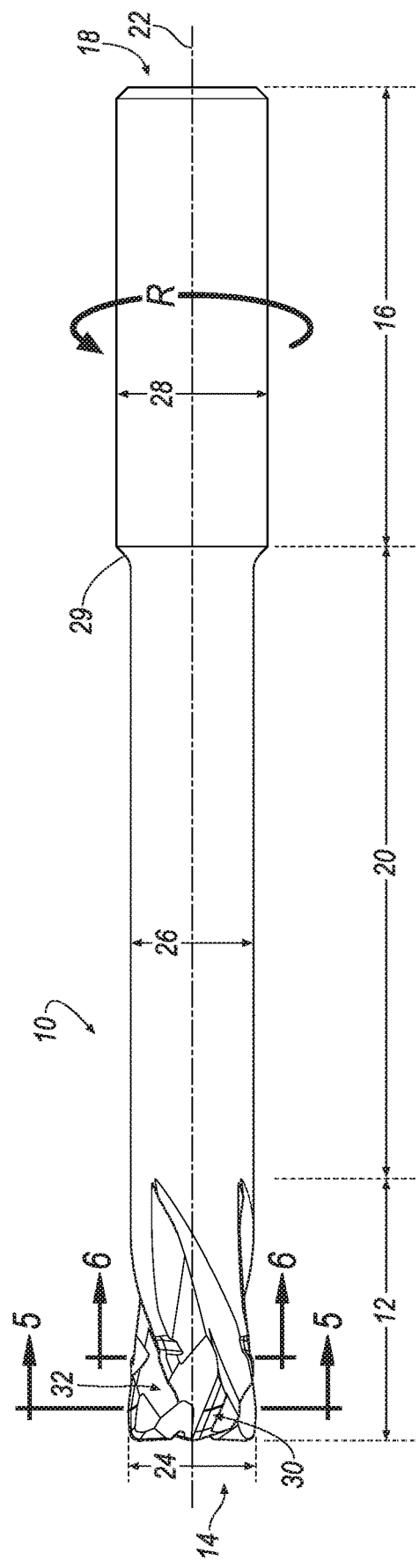
FIG. 2 is a side view of an orbital drill for machining through stacks of multiple types of materials according to an exemplary embodiment of the invention.
Figure 3:
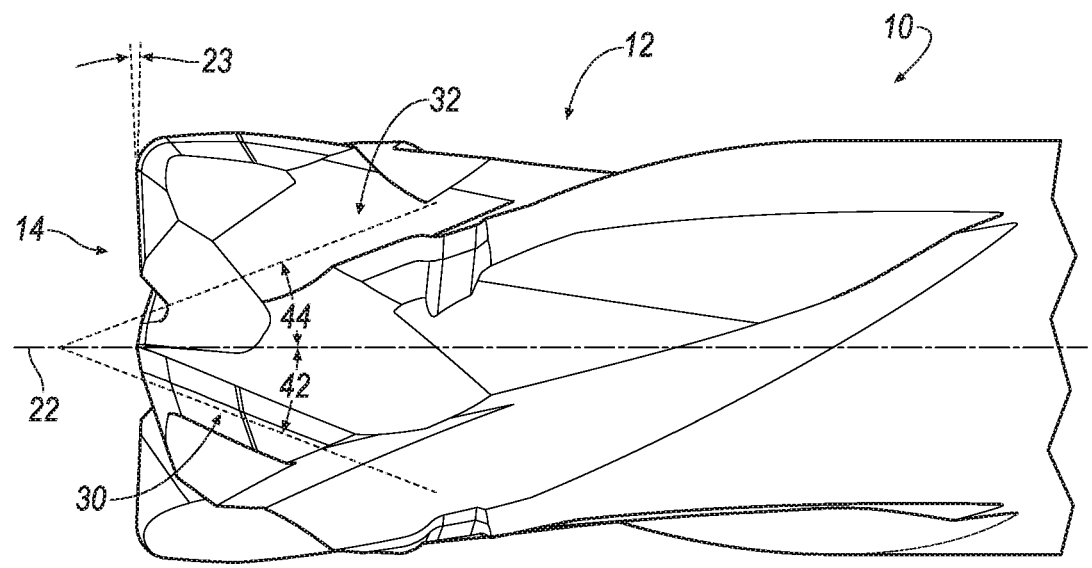
FIG. 3 is an enlarged side view of the drilling portion of the orbital drill of FIG. 2 showing the right-handed spiral flutes and the left-handed spiral flutes located rearward of the right-handed spiral flutes.
Figure 4:
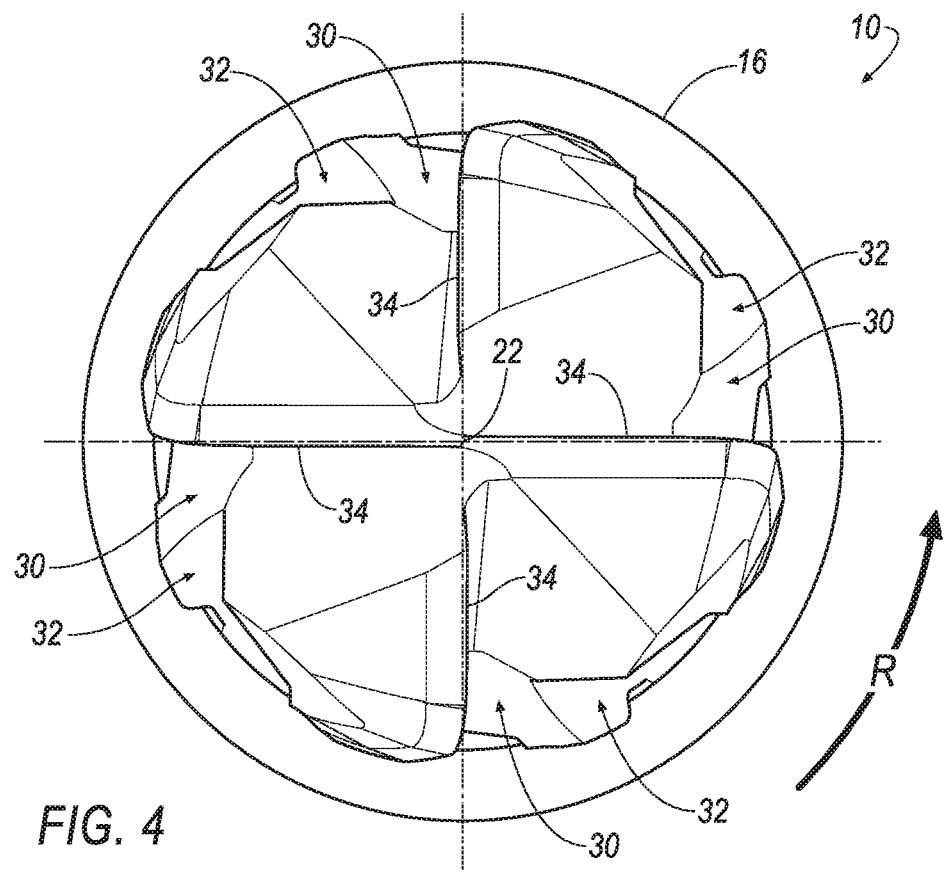
FIG. 4 is an enlarged end view of the orbital drill of FIG. 2 showing the right-handed spiral flutes and the left-handed spiral flutes located rearward of the right-handed spiral flutes.

As shown in FIGS. 2-4, the drilling portion 12 of the orbital drill 10 includes at least one flute 30 having a first spiral configuration, and at least one flute 32 located rearward (i.e., toward the shank portion 16) of the at least one flute 30 and having a second, different spiral configuration. In one embodiment, the at least one flute 30 has a right-handed spiral configuration, and the at least one flute 32 has a left-handed spiral configuration. As mentioned earlier, the flutes 30 having a right-handed spiral configuration pull the chips toward the back of the orbital drill 10 and out the hole to be machined in the workpiece (not shown), and the flutes 32 having a left-handed spiral configuration push the chips ahead of the orbital drill 10 and out the other side of a hole to be machined in the workpiece. As a result, the orbital drill 10 has a positive cutting action while orbiting into the material and back out (i.e., retracting) during a machining operation to be machined In the illustrated embodiment, the orbital drill 10 has a total of four (4) flutes 30 having a right-handed spiral configuration, and a total of four (4) flutes 32 having a left-handed spiral configuration. However, it will be appreciated that the invention is not limited by the total number of right-handed spiral flutes 30 and left-handed spiral flutes 32, and that the invention can be practiced using any desirable number of right-handed and left-handed spiral flutes 30, 32, respectively, such as two (2), six (6), eight (8), and the like, so long as the orbital drill 10 has at least one right-handed spiral flute 30 and at least one left-handed spiral flute 32 located rearward of the at least one right-handed spiral flute 30.

As shown in FIG. 3, the cutting edge of each right-handed spiral flute 30 is formed at a positive axial rake angle 42 with respect to the longitudinal axis 22 of the orbital drill 10. In the illustrated embodiment, the axial rake angle 42 is approximately thirty (30) degrees. Similarly, the cutting edge of each left-handed spiral flute 32 is formed at a positive axial rake angle 44 with respect to the longitudinal axis 22 of the orbital drill 10. In the illustrated embodiment, the axial rake angle 44 is approximately thirty (30) degrees. It will be appreciated that the invention can be practiced with the axial rake angle 42 of the right-handed spiral flutes 30 being different than the axial rake angle 44 of the left-handed spiral flutes 32.

Figure 5:
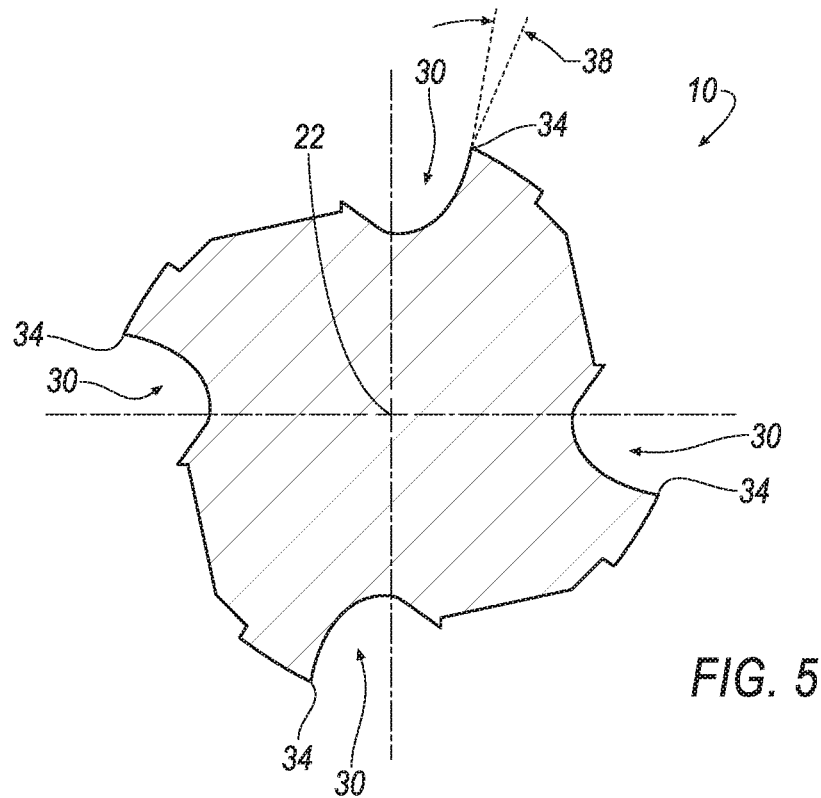
FIG. 5 is a cross-sectional view taken along line 5-5 of FIG. 2 through the right-handed spiral flutes.
Figure 6:
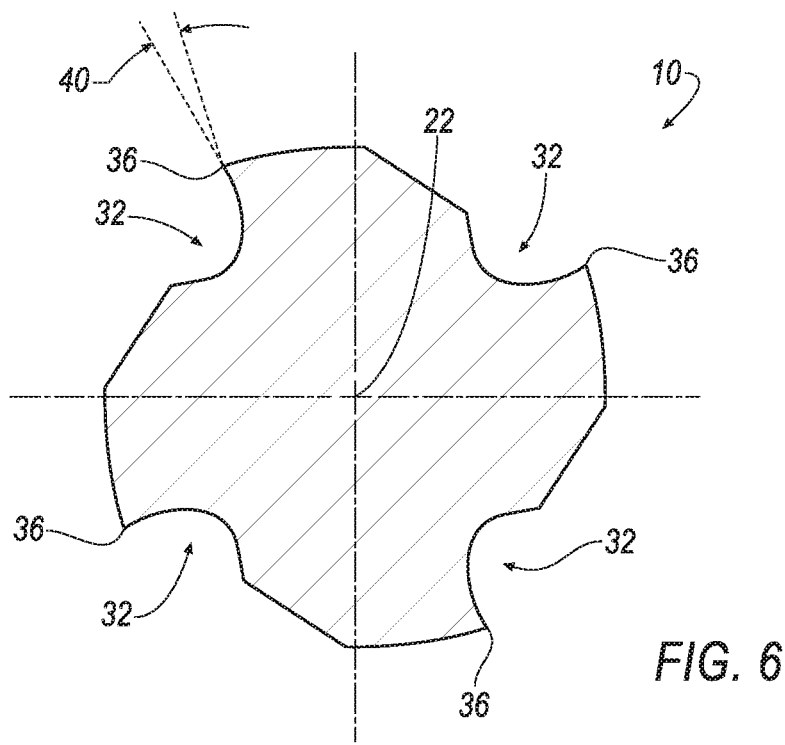
FIG. 6 is a cross-sectional view taken along line 6-6 of FIG. 2 through the left-handed spiral flutes.

Referring now to FIGS. 5 and 6, each of the four flutes 30 having the right-handed spiral configuration defines a cutting edge 34 that cuts the workpiece (not shown) when the orbital drill 10 enters into the workpiece. Similarly, each of the four flutes 32 having the left-handed spiral configuration defines a cutting edge 36 that cuts the workpiece (not shown) when the orbital drill 10 exits out of the workpiece.

One aspect of the invention is that each cutting edge 34 defines a positive radial rake angle 38 and a positive axial rake angle 42, and each cutting edge 36 defines a positive radial rake angle 40 and a positive axial rake angle 44. Specifically, the right-handed spiral flutes 30 with the positive radial rake angle 38 and the positive axial rake angle 42 freely cut the materials on the entry (i.e., orbiting into the materials), and the left-handed spiral flutes 32 located rearward of the right-handed spiral flutes 30 with the positive radial rake angle 40 and the positive axial rake angle 44 freely cut the materials on the exit (i.e., orbiting back out of the materials), thereby eliminating the need for a separate reaming operation As shown in FIGS. 5 and 6, all the flutes 30, 32 are the same hand of cut. In particular, all the flutes 30, 32 of the exemplary orbital drill 10 are right hand of cut (i.e., right hand rotation). Thus, the orbital drill 10 revolves counter-clockwise in the direction, R, about the longitudinal axis 22 to cut when viewed from the cutting end 14 of the orbital drill 10, as shown in FIG. 4. However, it will be appreciated that the invention can be practiced with the flutes 30, 32 having a left hand of cut (i.e., left hand rotation) such that the orbital drill 10 will revolve clockwise to cut when viewed from the cutting end 14.

In operation, the orbital drill 10 is positioned at a desired location to begin the machining cycle. At this location, the central, longitudinal axis 22 of the orbital drill 10 is substantially aligned with a hole (not shown) to be machined in a workpiece. The workpiece may comprise, for example, a single material or a composite material having two or more layers of material having different material properties. For example, the workpiece may comprise a top layer of carbon fiber reinforced plastic (CFRP) material and a bottom layer of metal material, such as Titanium, and the like.

Once substantially aligned, a hole is machined in the workpiece (not shown) with the drilling portion 12 of the orbital drill 10 using an orbital drilling operation (helical interpolation or circular). In the orbital drilling operation, the central, longitudinal axis 22 of the orbital drill 10 is moved in a helical or circular direction about a central axis of the hole. The hole may be full diameter at the entrance only, or be completely finished to full diameter, or may have some finishing stock on the internal diameter (ID) of the hole. Note that during the orbital drilling operation, the removal of the material is accomplished by using the cutting edges 34 of the right-handed spiral flutes 30 of the drilling portion 12 of the orbital drill 10, which pull the chips toward the rear of the orbital drill 10 and out the hole, thereby preventing damage to the material.

Then, the orbital drill 10 is moved out of the hole (i.e., retracted again using an orbital drilling operation) in the workpiece such that the cutting edges 36 of the left-handed spiral flutes 32 remove any residual material in the hole to the finished diameter, thereby eliminating the reaming operation necessary when using conventional orbital drills. It should be noted that the flutes 32 having a left-handed spiral configuration push the chips ahead of the orbital drill 10 and out the other side of a hole to be machined in the workpiece, thereby preventing any damage to the workpiece. At this point, the machining operation is completed.

As mentioned above, the workpiece may comprise a composite material having two of more layers of material having different material properties. In this instance, the orbital drill 10 is further moved into the workpiece using an orbital drilling operation until the drilling portion 12 has drilled completely through all the layers of material of the workpiece. Note that the cutting edges 34 of the right-handed spiral flutes 30 of the drilling portion 12 of the orbital drill 10 are used when the orbital drill 10 is moved into the workpiece, which pull the chips toward the rear of the orbital drill 10 and out the hole, thereby preventing damage to the workpiece.

Next, the orbital drill 10 is moved away from the workpiece using an orbital drilling operation in a helical or circular direction about the central axis of the hole. When the orbital drill 10 is moved away from the workpiece, the cutting edges 36 of the left-handed spiral flutes 32 remove any residual material to the finished diameter, thereby eliminating the reaming operation necessary when using conventional orbital drills. It should be noted that the flutes 32 having a left-handed spiral configuration push the chips ahead of the orbital drill 10 and out the other side of a hole to be machined in the workpiece, thereby preventing any damage to the workpiece. At this point, the machining operation is completed.

As described above, the one or more right-handed spiral flutes 30 with a positive radial rake angle 38 and positive axial rake 42 provides a positive cutting action while plunging the orbital drill 10 into the workpiece, and the one or more left-handed spiral flutes 32 with a positive radial rake angle 40 and positive axial rake 44 that are located rearward of the right-handed spiral flutes 30 provides a positive cutting action while retracting the orbital drill 10 out of the workpiece.

The patents and publications referred to herein are hereby incorporated by reference.

Having described presently preferred embodiments the invention may be otherwise embodied within the scope of the appended claims.

What is claimed is:

1. A cutting tool for forming a hole in a material, comprising:
    a drilling portion; and
    a shank portion,
    wherein the drilling portion includes a first flute having a right-handed helix configuration with a first cutting edge having a positive axial rake angle for positive cutting action while orbiting into a material to form a hole in the material, and a second flute located rearward of the first flute and having a left-handed helix configuration with a second cutting edge having a positive axial rake angle for positive cutting action while orbiting back out of the material and removing any residual material in the hole due to deflection of the cutting tool when orbiting into the material, thereby eliminating a separate reaming operation;
    wherein the first cutting edge overlaps the second cutting edge in the axial direction; and
    wherein the cutting tool comprises an orbital drill.

2. The cutting tool of claim 1, wherein the first flute and the second flute both are right hand of cut.

3. The cutting tool of claim 1, wherein the first cutting edge of the first flute and the second cutting edge of the second flute both have a positive radial rake angle.

4. The cutting tool of claim 1, wherein the drilling portion has a diameter smaller than a diameter of shank portion.

5. The cutting tool of claim 4, further comprising a tapered surface between the neck portion and the shank portion.

6. The cutting tool of claim 1, further comprising a neck portion between the drilling portion and the shank portion.

7. The cutting tool of claim 6, wherein the neck portion has a diameter smaller than a diameter of the drilling portion.

8. The cutting tool of claim 6, further comprising a circumferential tapered surface between the neck portion and the shank portion.

9. The cutting tool of claim 1, wherein the material comprises a composite material of carbon fiber reinforced plastic (CFRP) and a metal material.

10. An orbital drill, comprising:
    a drilling portion; and
    a shank portion; and
    a neck portion between the drilling portion and the shank portion,
    wherein the drilling portion includes a first flute having a right-handed helix configuration with a first cutting edge having a positive axial rake angle for positive cutting action while orbiting into a material to form a hole in the material using a first orbital drilling operation, and a second flute located rearward of the first flute and having a left-handed helix configuration with a second cutting edge having a positive axial rake angle for positive cutting action while orbiting back out of the material using a second orbital drilling operation, thereby removing any residual material in the hole due to deflection of the cutting tool when orbiting into the material using the first orbital drilling operation, thereby eliminating a separate reaming operation; and
    wherein the first cutting edge overlaps the second cutting edge in the axial direction.

11. The orbital drill of claim 10, wherein the first flute and the second flute both are right hand of cut.

12. The orbital drill of claim 10, wherein the first cutting edge of the first flute and the second cutting edge of the second flute both have a positive radial rake angle.

13. The orbital drill of claim 10, wherein the drilling portion has a diameter smaller than a diameter of shank portion.

14. The orbital drill of claim 10, wherein the neck portion has a diameter smaller than a diameter of the drilling portion.

15. The orbital drill of claim 10, further comprising a tapered surface between the neck portion and the shank portion.

16. The orbital drill of claim 10, further comprising a circumferential tapered surface between the neck portion and the shank portion.

17. The orbital drill of claim 10, wherein the material comprises a composite material of carbon fiber reinforced plastic (CFRP) and a metal material.

18. A method of machining a workpiece using an orbital drill, the orbital drill comprising a drilling portion and a shank portion, wherein the drilling portion includes a first flute having a right-handed helix configuration with a first cutting edge having a positive axial rake angle, and a second flute located rearward of the first flute and having a left-handed helix configuration with a second cutting edge having a positive axial rake angle and overlapping the first cutting edge in the axial direction, the method comprising:
    positioning the orbital drill with respect to a workpiece to begin a machining cycle; and forming a hole in the workpiece with the cutting edge of the first flute with the right-handed spiral configuration using a first orbital drilling operation; and
    moving the orbital drill out from the hole in the workpiece using a second orbital drilling operation,
    wherein residual material due to deflection of the orbital drill when forming the hole in the workpiece using the first orbital drilling operation is removed from the hole using the cutting edge of the left-handed spiral flutes when moving the orbital drill out from the workpiece using the second orbital drilling operation.

* * * * *